(12) United States Patent
Stubler et al.

(10) Patent No.: US 10,587,795 B2
(45) Date of Patent: Mar. 10, 2020

(54) SYSTEM FOR PRODUCING COMPLIANT FACIAL IMAGES FOR SELECTED IDENTIFICATION DOCUMENTS

(71) Applicant: Kodak Alaris Inc., Rochester, NY (US)

(72) Inventors: Peter Stubler, Rochester, NY (US); David Kloosterman, Rochester, NY (US); Joseph A. Manico, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 16/189,211

(22) Filed: Nov. 13, 2018

(65) Prior Publication Data

US 2019/0082100 A1 Mar. 14, 2019

Related U.S. Application Data

(63) Continuation of application No. 15/074,576, filed on Mar. 18, 2016, now Pat. No. 10,129,460, and a
(Continued)

(51) Int. Cl.
*H04N 5/232* (2006.01)
*G06K 9/00* (2006.01)
(Continued)

(52) U.S. Cl.
CPC ..... *H04N 5/23219* (2013.01); *G06K 9/00228* (2013.01); *G06K 9/00248* (2013.01);
(Continued)

(58) Field of Classification Search
CPC ........... H04N 5/23219; H04N 5/23229; H04N 5/23222; G06K 9/00288; G06K 9/00456;
(Continued)

(56) References Cited

U.S. PATENT DOCUMENTS

| 6,535,636 B1 | 3/2003 | Savakis et al. |
| 8,270,682 B2 | 9/2012 | Stubler |

(Continued)

FOREIGN PATENT DOCUMENTS

| CN | 101379488 A | 3/2009 |
| WO | 2007090727 A1 | 8/2007 |

OTHER PUBLICATIONS

"ID station User Manual," Aug. 2013, http://www.idstation.eu/Doc/UserManualENG.pdf, pp. 5-15 and 21-23.
(Continued)

*Primary Examiner* — Albert H Cutler
(74) *Attorney, Agent, or Firm* — Hogan Lovells US LLP

(57) ABSTRACT

A method of recoding a photograph for use in a personal photo identification document such as a passport includes using a digital image capture system, including a digital camera, a computer processor, and memory to store specifications and requirements for a photo print in order to be compliant for use in a user selected photo ID such as a passport for a selected country or jurisdiction, using the digital image capture system to capture a facial image, using facial image processing techniques to provide automatic detection of a face and facial feature points on the facial image, processing the facial image and generating a visual indication of compliance, and when compliant, generating the photograph based on the compliant facial image.

9 Claims, 5 Drawing Sheets

Related U.S. Application Data continuation of application No. 14/457,292, filed on Aug. 12, 2014, now Pat. No. 9,369,625.

(51) Int. Cl.
*G06K 9/52* (2006.01)
*G06K 9/03* (2006.01)

(52) U.S. Cl.
CPC ..... *G06K 9/00255* (2013.01); *G06K 9/00268* (2013.01); *G06K 9/00288* (2013.01); *G06K 9/00456* (2013.01); *G06K 9/036* (2013.01); *G06K 9/52* (2013.01); *H04N 5/23222* (2013.01); *H04N 5/23229* (2013.01)

(58) Field of Classification Search
CPC ...... G06K 9/00268; G06K 9/52; G06K 9/036; G06K 9/00228; G06K 9/00255; G06K 9/00248

See application file for complete search history.

(56) References Cited

U.S. PATENT DOCUMENTS

| | | | |
|---|---|---|---|
| 8,498,453 | B1 | 7/2013 | Benson et al. |
| 2002/0093568 | A1 | 7/2002 | Chumbley |
| 2003/0156199 | A1 | 8/2003 | Shindo et al. |
| 2003/0202685 | A1 | 10/2003 | Shimizu et al. |
| 2004/0120553 | A1 | 6/2004 | Stobbe |
| 2005/0201594 | A1* | 9/2005 | Mori .................... A61B 5/1128 382/107 |
| 2006/0153429 | A1 | 7/2006 | Gehlen et al. |
| 2006/0171004 | A1 | 8/2006 | Hori |
| 2008/0192129 | A1 | 8/2008 | Walker et al. |
| 2008/0297617 | A1 | 12/2008 | Jeong |
| 2010/0225773 | A1* | 9/2010 | Lee ....................... H04N 5/232 348/222.1 |
| 2010/0315521 | A1 | 12/2010 | Kunishige et al. |
| 2011/0074979 | A1 | 3/2011 | Huang et al. |
| 2011/0234779 | A1 | 9/2011 | Weisberg |
| 2011/0274316 | A1* | 11/2011 | Jeong ................. H04N 21/4223 382/103 |
| 2012/0075483 | A1* | 3/2012 | Paoletti ................ A61B 5/4561 348/207.1 |
| 2014/0192217 | A1* | 7/2014 | Kim .................... H04N 5/23293 348/222.1 |
| 2015/0029304 | A1* | 1/2015 | Park .................... H04N 5/23238 348/36 |
| 2015/0036898 | A1 | 2/2015 | Cohen et al. |
| 2015/0207985 | A1 | 7/2015 | Uemura et al. |
| 2015/0261996 | A1 | 9/2015 | Kim |
| 2016/0050363 | A1 | 2/2016 | Stubler et al. |
| 2016/0156840 | A1* | 6/2016 | Arai ................... H04N 5/23219 348/77 |

OTHER PUBLICATIONS

International Search Report dated Nov. 26, 2015 in corresponding PCT application No. PCT/US2015/042178.

Min et al., "Efficient Detection of Occlusion Prior to Robust Face Recognition," The Scientific World Journal, vol. 2014, Jan. 16, 2014, 10 pages.

Chinese Office Action dated Jan. 23, 2018 in Chinese Patent Application No. 201580047921.6.

\* cited by examiner

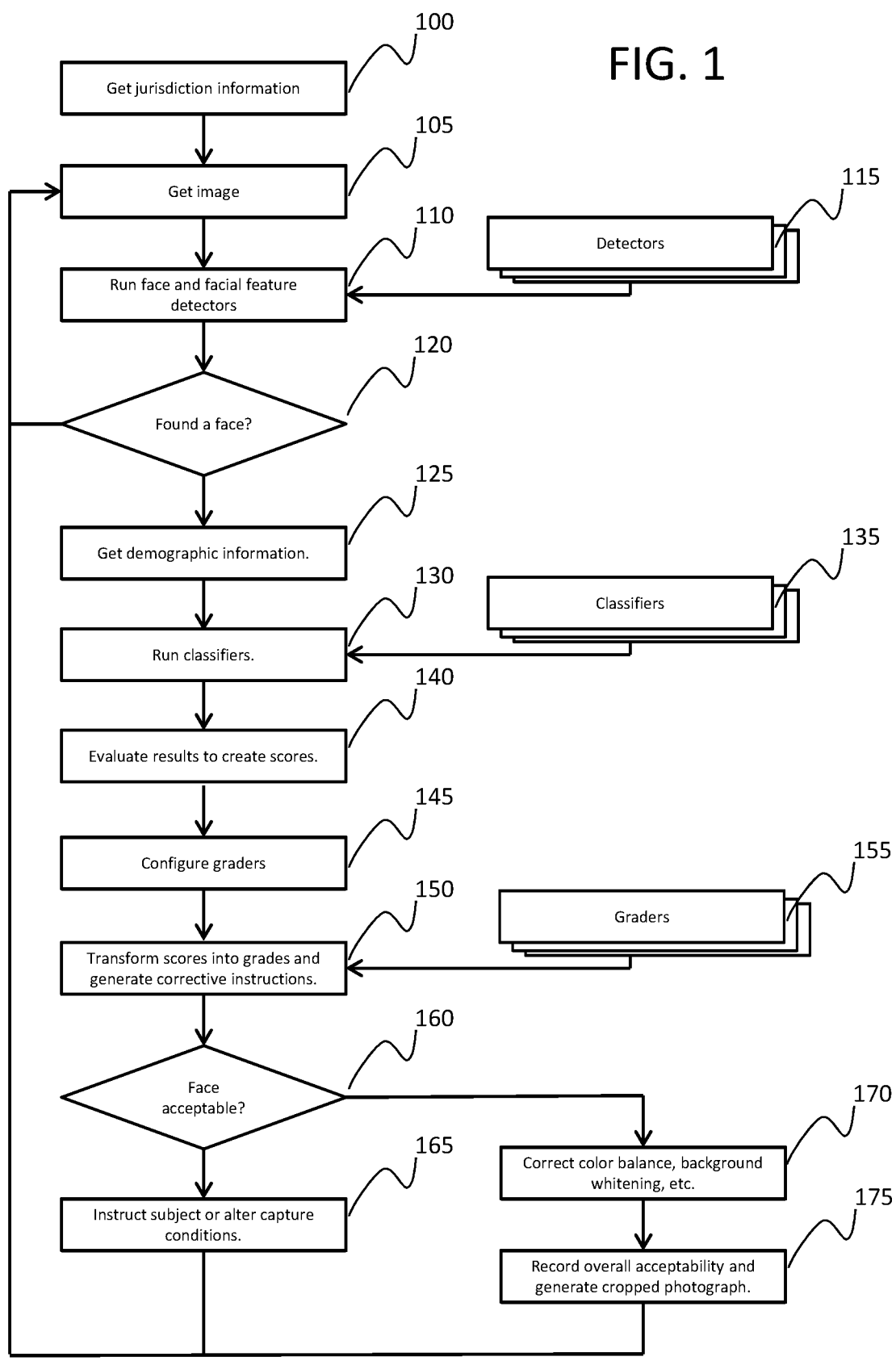

SYSTEM FOR PRODUCING COMPLIANT FACIAL IMAGES FOR SELECTED IDENTIFICATION DOCUMENTS

CROSS-REFERENCE TO RELATED APPLICATIONS

This application is a continuation of U.S. application Ser. No. 15/074,576, filed on Mar. 18, 2016, later issued as U.S. Pat. No. 10,129,460, which is a continuation of U.S. application Ser. No. 14/457,292, filed on Aug. 12, 2014, later issued as U.S. Pat. No. 9,369,625. The aforementioned applications are hereby incorporated by reference in their entirety.

FIELD OF THE INVENTION

The present invention relates to a method for providing a photograph for use in a personal photo identification document such as a passport that automatically corrects for numerous environmental and subject requirements across numerous jurisdictions.

BACKGROUND OF THE INVENTION

Passport photos and other photo identification documents normally include numerous requirements associated with the subject of the photo, the environment around the subject, and the quality of the photograph produced. These requirements vary according to jurisdiction and to the desired types of identification documents. These requirements are henceforth referred to as jurisdictional requirements or more simply requirements. While these photos are readily obtained at a retail location with the aid of an operator, there is no guarantee that the photos obtained will actually be compliant with all of the requirements of a given jurisdiction, and there is no guarantee that the operator will be completely cognizant of all of the applicable requirements. What is desired, therefore, is a method that will automatically generate the desired photo identification documents that are compliant with all of the applicable requirements in a given jurisdiction.

SUMMARY OF THE INVENTION

The present invention is a method of recording a photograph for use in a personal photo identification document such as a passport. The digital image capture system, including a digital camera, a computer processor, and memory stores the specifications and requirements for a photo print in order to be compliant for use in a user selected photo ID such as a passport for a selected country or jurisdiction. Facial image processing techniques are used to provide automatic detection of the face and facial feature points. They provide automatic zoom, automatic in-plane rotation, automatic crop, and the analysis of several attributes to determine; the pose of the head, the countenance of the eyes and mouth, the illumination of the subject, the appearance of the background environment, and the photographic quality of the image, in order to assist an operator in determining if a picture meets all jurisdictional requirements. In some instances, problems such as minor head misalignment are automatically corrected the image to bring the image into compliance.

Jurisdictional requirements are associated with the subject of the photo, the environment around the subject, and the quality of the photograph produced. Examples of requirements regarding the subject of the photo may require the subject to be facing and looking directly toward the camera with both eyes open. Some jurisdictions may require the subject to assume a neutral expression, and specifically not to smile. Some jurisdictions may require the background surrounding the subject appear as specific color, for example plain white without any visible texture. Jurisdictions may require image quality aspects such as proper contrast, brightness, sharpness, and resolution.

In some embodiments of the present invention, lighting is under control of the computer processor. In these cases, the computer processor may automatically alter the lighting so as to maximize the compliance of the pictures taken.

An image is processed and a visual indication of the compliance to the jurisdictional requirements is provided. For each requirement, a pass or fail indication is provided. Optionally, an indication of the degree of compliance can be displayed as well as instructions as to how to correct any non-compliance. In some embodiments, a video stream can be processed to provide immediate feedback to the operator to aid in ensuring the recording of an image that meets all requirements. In such an embodiment, all frames meeting acceptability standards are recorded. A further processing step is taken to choose the most compliant frames and remove apparently redundant frames, thus simplifying the task of choosing a single image.

Since the requirements for such photos can vary between jurisdictions, the requirements and acceptability limits are configurable. Such requirements may be stored and loaded from configuration settings corresponding to each jurisdiction or be altered by the operator. Requirements that are commonly related can be grouped and be presented or hidden together. For example, in the preferred embodiment, requirements related to illumination, resolution, and background can be grouped together and are presented under the heading "Environment". Requirements related to pose, gaze, and expression are grouped under the heading "Subject". Once properly established for a fixed location, the "Environment" values are unlikely to change from subject to subject or image to image in the same way as the "Subject" values. The group association of each requirement is fully configurable in the preferred embodiment.

The system is provided in an autonomous photo booth or as an application for a computer, smart phone, or tablet equipped with a user facing camera and display screen. In the autonomous photo booth embodiment, the image displayed to the user is reflected along the vertical axis to simulate a mirror. Any visual indicators tied to left or right are similarly mirrored. In addition, either an operator assisted or autonomous version of the system can be operated so that the image is captured and recorded once the subject's pose comes into compliance with the specifications and requirements of the selected photo identification document type. While the system is designed to operate automatically, the operator has the ability to override the requirement measurements to accommodate situations arising from unique characteristics of a subject. (For instance, the light balance estimator uses the reflectance of the subject's skin to determine whether the subject is evenly lit. This estimate could be thrown off if the subject had differences in skin tone between the left and right sides of the face. Examples of this could be a large birthmark or a face tattoo.)

The method of the present invention uses bio-metrics to develop a photo ID or passport photo using a combination of image processing technology, facial image processing, and other advanced technologies to auto-zoom, auto crop, and analyze several facial attributes (head pose, eyes open, no smile, proper gaze, environment, and the like) to assist an operator to determine if a desired photo meets all jurisdictional requirements. In some instances such as minor head roll (in-plane rotation) out of specification, the method of the present invention will automatically fix the facial image to bring it into compliance. The present invention analyses the following bio-metrics associated with a facial image including: head scale and position (cropping), head pose (pitch, yaw, roll), openness of the eyes (combined score for both eyes), mouth (combined score for no-smile and mouth closed), gaze (combined score for up or down and left or right), resolution with respect to head size and placement, lighting balance, eyeglass reflection, and crop boundaries.

The method of the present invention uses a tiered or cascaded approach in that requirements are evaluated in an order based upon dependency and computational complexity. For an example of dependency, it makes no sense to attempt to evaluate gaze if the eyes are not open or to evaluate lighting balance for a profile facial image. For an example of computational complexity, simple or basic tests such as face detection and head pose are run on every image; more complex requirements such as occlusion detection or general expression are evaluated only after the image has been deemed acceptable by all simpler requirements.

The image capture device used in carrying out the method of the present invention may be able to perform some of the more computationally simple functions, but transfer images to an external resource such as a cloud-based service to perform more computationally intensive operations. Results may be returned to the point of capture to provide the above mentioned feedback for the operator.

The method of the present invention uses jurisdictional and demographic information to establish an output portrait configuration and the jurisdictional requirements such a photograph must meet. The demographic information may include information such as age and gender. For example, in some jurisdictions, the placement of the head within the output image is different for infants and adults. Such demographic information may be entered by the operator or be automatically estimated by the system.

The method of the present invention can include an exception menu or warning. Such a warning would indicate to the operator or user that some aspect of the configuration requirements could not be met such as: incorrect pose, incorrect facial orientation, obscuring headwear, dark glasses, obscuring scarves, eye patches, asymmetrical facial conditions, inappropriate expression (mouth opened, eyes closed, extreme expression), or extremely large hairdos.

The method of the present invention can automatically set configuration specifications and background style/color based on a photo document type and jurisdiction.

The method of the present invention also provides a method for subject-specific automatic pitch and yaw determination.

BRIEF DESCRIPTION OF THE DRAWINGS

FIG. 1 is a flow chart of a method for producing compliant facial images for selected identification documents in accordance with the present invention;

DETAILED DESCRIPTION

Figure 2A:
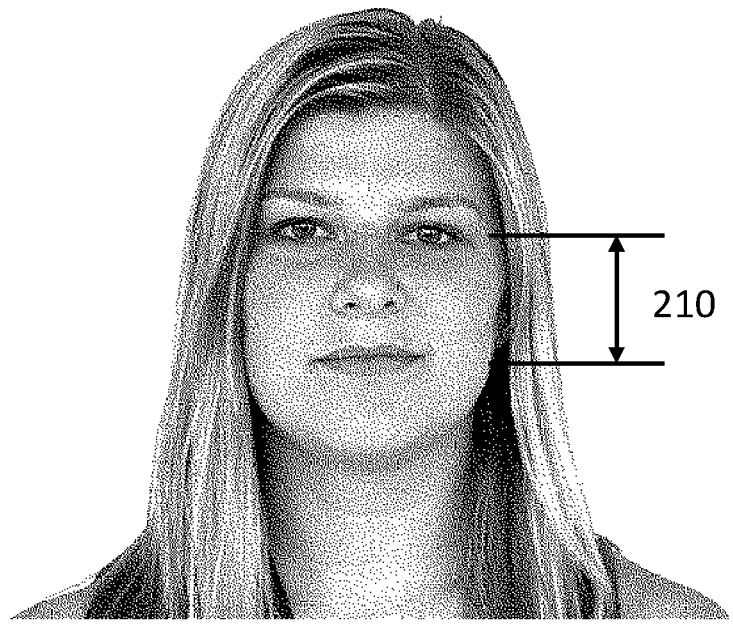
FIGS. 2A and 2B illustrate the foreshortening of the apparent distances between face parts due to head pose.

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The general workflow of the method of the present invention is illustrated in FIG. 1. In step 100 the image capture system is provided with information on the jurisdiction for the photographic ID which corresponds to one or more sets of jurisdictional requirements. The method enters its main loop of execution when an image is provided by the image capture system at step 105. Face detection and facial feature point detection is performed at step 110 using detectors 115. If a face is found at step 120, then demographic information corresponding to the face is provided 125. The demographic information may include information such as age and gender where such information may influence the selection of jurisdictional requirements. In some embodiments of this method, this information may automatically be estimated by use of classifiers which automatically infer such information from the image. In step 130, a set of classifiers 135 are executed on each face to determine classification values. Such classifiers estimate head pose information, gaze direction, eye and mouth openness, degree of smile, or any other aspect of the facial image corresponding to a jurisdictional requirement. The values of the classifiers are evaluated to create scores corresponding to each of the jurisdictional requirements. In some cases, scores are derived from a single classifier; in others they may be combined. For instance, a single score for eye openness may be obtained by combining the classifier results for the right and left eyes. In step 145, the jurisdictional and demographic information are used to configure the graders 155.

Scores reflect a measurement of some aspect of the photo corresponding to a jurisdictional requirement such as the openness of the eyes or direction of gaze. They do not directly indicate the acceptability of these values. That is the function of the graders. The scores are then transformed into grades in step 150. In the preferred embodiment, the grades provided are simply "pass" or "fail" indicating whether the photo meets the corresponding jurisdictional requirement. In alternate embodiments, an indeterminate or "neutral" grade may be reported. For failing grades, instructions can be generated to guide the subject or operator in correcting the deficit. For example, if the subject's eyes are not open enough, these corrective instructions may request the subject to widen his or her gaze. If the failure corresponds to some aspect under system control, the corrective instructions may include operations to automatically correct the situation. An example of the latter would be if the grader indicated a lighting imbalance causing one side of the subject's face to be darker than the other. If the lighting was under system control, adjustments could be generated to automatically correct the problem.

If the face is deemed unacceptable at step 160, the corrective instructions are provided to the operator or subject; where possible, they may be automatically implemented 165. If the face is deemed to be acceptable, further operations may be taken to improve the quality of the image 170, such as correcting exposure and color balance or whitening the background. Finally, an affine transformation is calculated to scale, rotate, and crop the image at step 175 to generate a version with acceptable dimensions, resolution, and head placement for the jurisdiction. Further, the scores of the acceptable image may be recorded aid in the automatic selection of a photo when multiple acceptable photos are taken of the same subject.

Figure 2B:
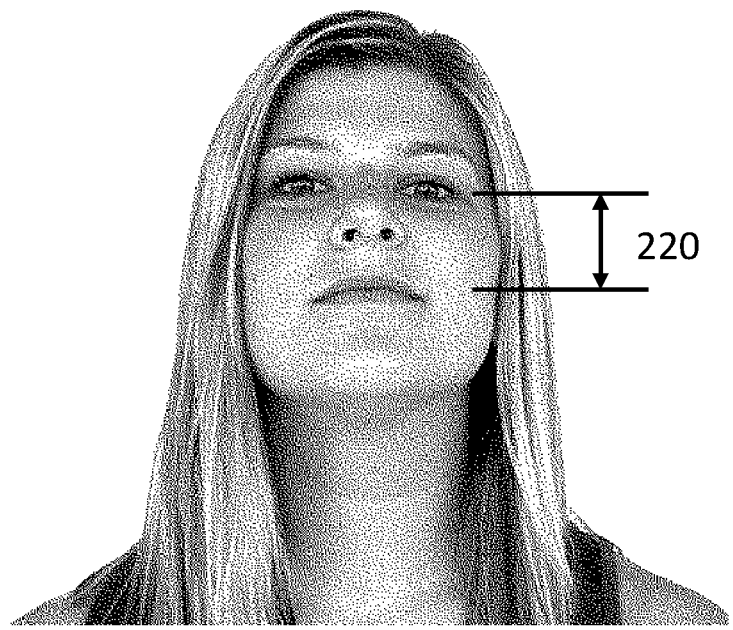

Head pitch estimation for a single frame image of an unknown subject is based on the relative locations of facial feature points and the distribution of these points on faces within the population of faces used to create the estimator. However, the distribution of these points varies significantly along the vertical axis within the human population. For instance the distance between the eyes and mouth, or nose and mouth can vary enough to lead to inaccuracies for the pitch estimation of an unknown subject. Since the eyes and mouth lay on a plane that is generally considered to be forward-facing, a pose that maximizes the apparent distance between the eyes and mouth due to foreshortening would define a pose with a pitch of zero degrees. Thus, the method of determining an optimal head pitch entails instructing the subject to change the pitch of his or her head while recording the apparent distance between the eyes and mouth. The head pose that maximizes this apparent distance (minimizes the foreshortening) is assumed to be a forward facing pose. Those skilled in the art will recognize that an optimal head yaw can be similarly determined by measuring the apparent distance between the outside corners of the eyes or mouth. FIGS. 2A and 2B illustrate the foreshortening effect due to head pitch. Distance 210, the distance between the eyes and mouth in FIG. 2A is greater than the distance 220 between the corresponding points in FIG. 2B.

Many jurisdictions have requirements for the overall brightness or exposure, contrast, sharpness, and noise of the photograph. A method for measuring is described by Savakis, et al in U.S. Pat. No. 6,535,636 incorporated by reference herein.

Many jurisdictions have requirements limiting occlusions of the face by sunglasses, eye patches, scarves, hair, and other such items. One method of measuring the degree and location of facial occlusions is that taught by Min, et al in "Efficient Detection of Occlusion prior to Robust Face Recognition", The Scientific World Journal, vol. 2014, Article ID 519158, 10 pages, 2014. doi:10.1155/2014/519158, which is incorporated by reference herein. A method for detecting regions of scalp or facial hair in an image is described in commonly assigned U.S. Pat. No. 8,270,682 incorporated by reference herein. Those skilled in the art will readily recognize that there are many other methods of detecting facial occlusions and hair regions without departing from the principles and spirit of the invention.

Many jurisdictions have requirements regarding the color, brightness, and texture of the background surrounding the head of the subject. Once the face has been detected and regions of hair have been detected, the remaining regions of the image surrounding the head are considered to be background areas. Scores for the background can be generated by comparing mean and variance of the luminance and color of these regions to target threshold values. The variance provides an indication of the degree of texture found within the background region. Those skilled in the art will readily recognize that there are many other methods of measuring the luminance, color, and texture of the background region without departing from the principles and spirit of the invention.

Under normal lighting conditions with a uniform background, the balance of illumination on the left and right sides of the subject will be similar to the balance seen in the background. If the balance is inconsistent between the subject and background, and this imbalance cannot be accounted for by some form of occlusion, then an asymmetrical face condition due to facial coloration can be indicated to operator or subject.

Another form of facial asymmetry can be due to facial geometry. The spatial composition of a photographic is often determined by scaling and cropping the image such that the subjects eyes fall in predetermined locations. This normally results in the eyes being horizontally aligned and symmetrically placed across the vertical axis of the image. If the other facial features, such as the corners of the mouth and nose, are not similarly symmetrically placed across the vertical axis and the disparity is exceeds a predetermined threshold, an asymmetrical face condition due to facial geometry can be indicated to operator or subject The present invention can be operated on a sequence of facial images such as that obtained from a video stream or video file. For each image in the sequence the method described above in reference to FIG. 1 is performed. For video sequences, this may result in a large number of highly similar acceptable photos of the subject. It may be desirable to select a single photo or to provide a smaller set of acceptable photos from which the subject or operator may choose. It also may be desirable to select photos that are not sequentially close, since these photos are likely to be very similar.

Figure 3:
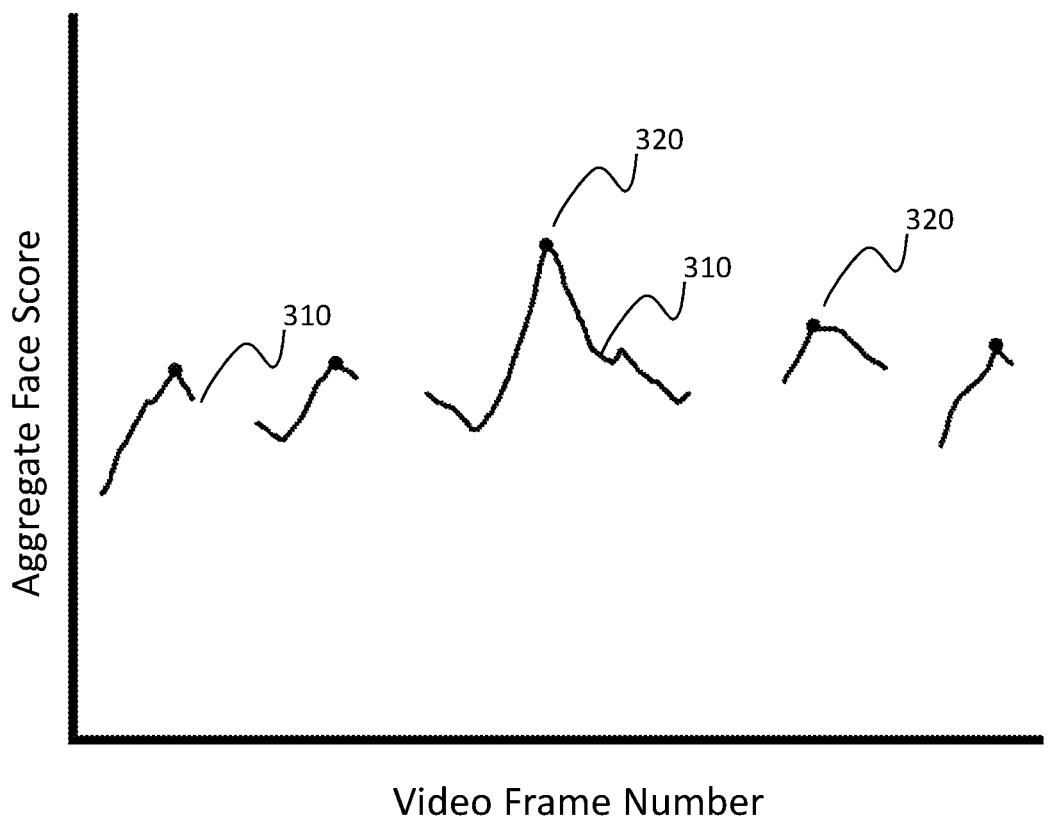
FIG. 3 illustrates a method for selecting a subset of compliant facial images extracted from a video stream.

For each acceptable facial image found within the sequence, the results of step 175 are recorded along with the image sequence number. The scores corresponding to each jurisdictional requirement are combined into an aggregate face score. In the preferred embodiment, this is accomplished by normalizing each requirement score into a range from zero to one, multiplying each normalized score by a weight proportional to the importance of the respective score and adding up the weighted scores. Those skilled in the art will readily recognize that there are many other methods of forming an aggregate score without departing from the principles and spirit of the invention. FIG. 3 illustrates a graph of the aggregate face score verses the frame number for such a video sequence. Within the total sequence, there may be subsequences producing acceptable photos 310. Within each subsequence, the photo with the highest aggregate face score 320 is selected as a representative. In some cases, it may be desirable to limit the number of photos from which to select to a very small number (e.g. two or three). If the number of subsequences exceeds this limit, then representatives with the highest aggregate face score are selected until the limit is reached.

Figure 4:
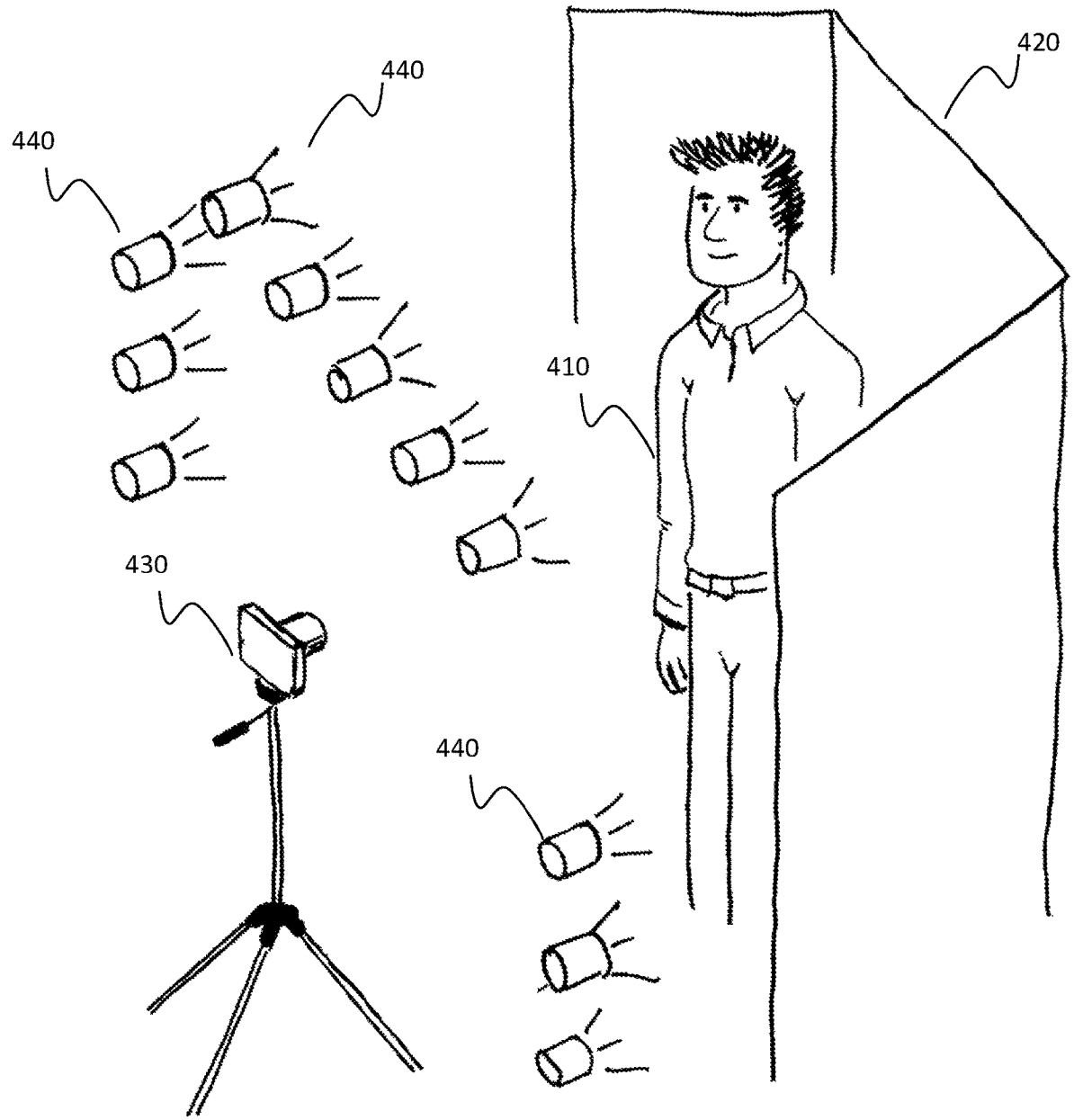
FIG. 4 is a diagram of a digital image capture system for use with the method of the present invention.

FIG. 4 illustrates an image capture environment. The subject 410 sits or stands in front of a background 420 and addresses the camera 430. An array of light sources is used to illuminate the subject 440. These lights may be the sole source of illumination or may augment ambient lighting conditions. The ambient lighting conditions may result in an imbalance in the illumination of the subject. An array of light sources can be manipulated to compensate any imbalanced illumination incident upon the subject. If the array of light sources is programmatically controlled by the system, then the adjustments can be made automatically such as in step 165 described in FIG. 1.

Figure 5:
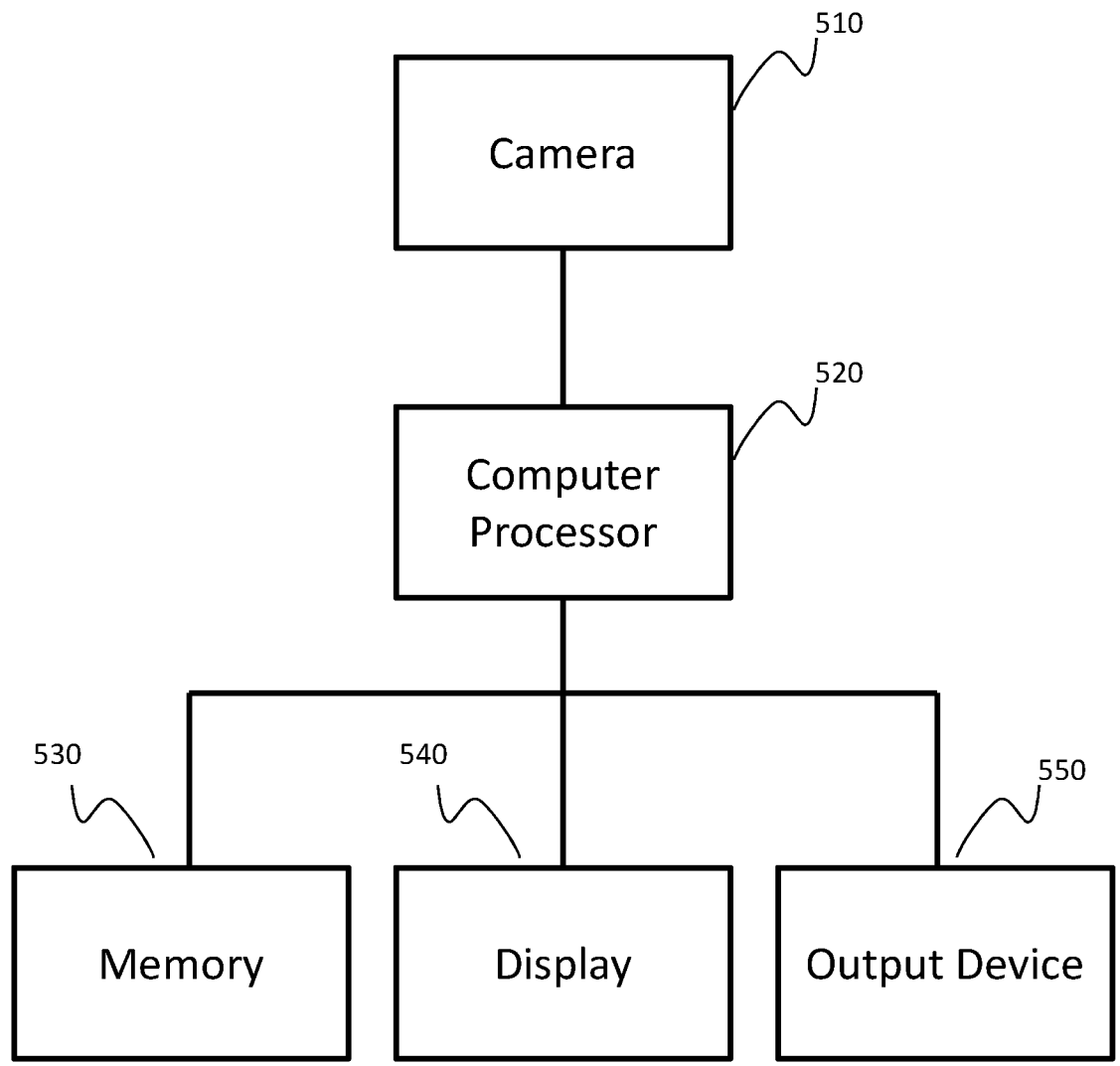
FIG. 5 is a block diagram of the digital image capture system hardware according to the present invention.

FIG. 5 shows a block diagram of the system. An image of the subject is captured by a digital camera 510. A computer processor 520 evaluates the image with respect to the requirements stored in memory 530 for a photo print in order to be compliant for use in a user selected photo ID such as a passport for a selected country or jurisdiction. The system may optionally include a display 540 for providing generating a visual indication of compliance and for providing instructions as to how to correct any non-compliance. The compliant image is generated and may be produced on an output device 550. This output device can be a printer or may be a digital storage device such as a disk or USB drive to store the compliant image in digital form on a for later use. The display 540 may be associated with the digital camera 510, or may be associated with the computer processor 520. Some embodiments of the present invention may use the output device 550 such as a printer to produce a visual indication of compliance in lieu of a display.

The invention has been described in detail with particular reference to certain preferred embodiments thereof, but it will be understood that variations and modifications can be effected within the spirit and scope of the invention.

PARTS LIST

100 Get jurisdiction information step
105 Get image step
110 Run face and facial feature detectors step
115 Detectors
120 Found face step
125 Get demographic information step
130 Run classifiers step
135 Classifiers
140 Evaluate results to generate scores step
145 Configure graders step
150 Transform scores into grades and generate corrective instructions step
155 Graders
160 Face acceptable step
165 Instruct subject or alter capture conditions step
170 Correct color balance, background whitening, etc. step
175 Create cropped image step
210 Eyes to mouth distance of a face addressing the camera
220 Eyes to mouth distance of a face not addressing the camera
310 Subsequence of images containing acceptable faces.
320 Peak aggregate face scores for each subsequence
410 Subject
420 Background
430 Camera
440 Array of light sources
510 Camera
520 Computer Processor
530 Memory
540 Display
550 Output Device

The invention claimed is:

1. A method of recording a photograph for use in a personal identification document comprising:
    storing a photograph specification on a digital image capture system, wherein the photograph specification defines compliance requirements for the personal identification document, the compliance requirements being specific to a jurisdiction, and wherein the digital image capture system comprises a computer processor and memory;
    capturing images by the digital image capture system, the images comprising a sequence of facial images of a person;
    detecting a face and facial feature points in each image that comprises the sequence of facial images;
    displaying an instruction to have the person change head pitch and head yaw;
    recording a head pitch change and a head yaw change while recording the distance between the person's eyes and mouth;
    using the recorded head pitch change and head yaw change to determine an optimal head pitch and an optimal head yaw;
    displaying an instruction to have the person reposition to achieve the optimal head pitch and the optimal head yaw;
    capturing, by the digital image capture system, an optimized photograph of the person, wherein the optimized photograph includes the person in a position having the optimal head pitch and the optimal head yaw;
    determining the person's demographic information by applying classifiers to the detected facial feature points;
    determining the demographic information compliance with the photograph specification; and
    the digital image capture system transmitting the optimized photograph to an output device.

2. The method of claim 1 wherein, the personal identification document is a passport for a selected country or jurisdiction.

3. The method of claim 1, wherein the digital image capture system is selected from the group consisting of: an autonomous photo booth, a smart phone equipped with a camera, a tablet equipped with a camera, and a personal computer equipped with a camera.

4. The method of claim 3, wherein the autonomous photo booth displays the captured images reflected along the vertical axis to simulate a mirror.

5. The method of claim 3, wherein capturing the optimized photograph occurs once the person's pose is compliant with the photograph specification.

6. The method of claim 1, further comprising the steps of:
    calculating, by the computer processor, an affine transformation to scale, rotate, and crop the optimized photograph;

modifying the optimized photograph in accordance with the affine transformation to achieve compliance with the compliance requirements of the photograph specification.

7. The method of claim 1, further comprising the steps of:
assigning, by the image capture system, a score to the captured images, wherein the score is proportional to the captured images' compliance with the compliance requirements;
storing, in the memory, the assigned scores in association with the respective captured images; and
automatically selecting one of captured images based on its assigned score.

8. The method of claim 1, wherein the compliance requirements include at least one selected from the group consisting of: a threshold image color, a threshold image brightness, and a threshold image background texture quality.

9. The method of claim 8, wherein compliance with the threshold image background texture quality is evaluated by comparing mean luminance and luminance variance for a plurality of image background regions to a threshold value for background luminance defined by the photograph specification.

* * * * *